Nov. 1, 1966             F. C. ROTHERMEL            3,282,017
METHOD OF PROVIDING INCREASED STRENGTH
TO COMPOSITE BEAM CONSTRUCTION
Filed May 14, 1963
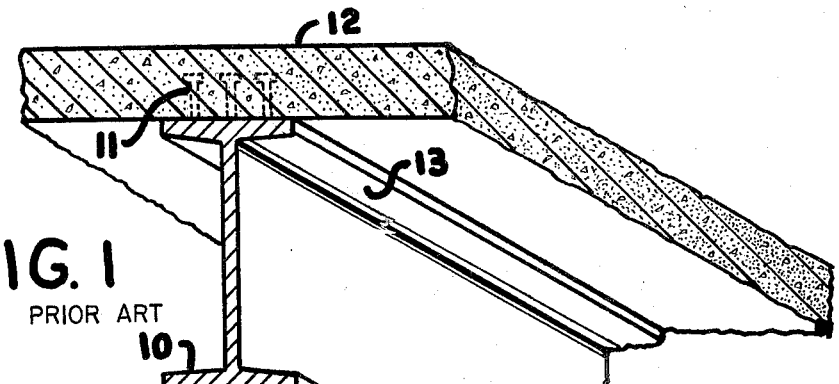
FIG. 1
PRIOR ART
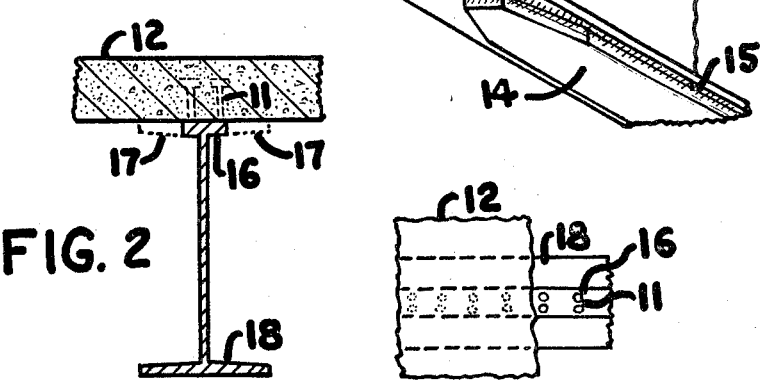
FIG. 2
FIG. 3
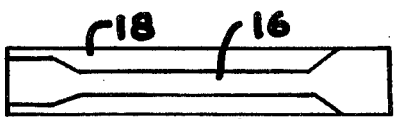
FIG. 4
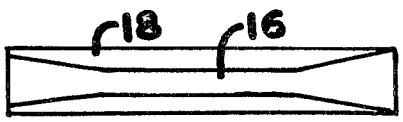
FIG. 5
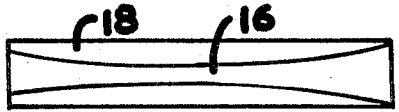
FIG. 6
INVENTOR.
FRANK C. ROTHERMEL
BY Frank C. Rothermel

United States Patent Office 3,282,017
Patented Nov. 1, 1966

3,282,017
METHOD OF PROVIDING INCREASED STRENGTH TO COMPOSITE BEAM CONSTRUCTION
Frank C. Rothermel, 6234 Jerome Circle,
Harrisburg, Pa.
Filed May 14, 1963, Ser. No. 280,371
2 Claims. (Cl. 52—741)

This invention relates in general to structural composite beams employing steel for tensile strength and concrete for compressive strength and relates in particular to the use of rolled steel beams, commonly known as wide flange steel beams for the tensile member.

For many years it has been common practice to increase the strength of the composite beam by welding a steel plate, commonly called a cover plate, to the bottom flange of the rolled steel beam. The bottom flange is commonly called the tension flange. This practice has proved economical because the concrete slab acts as the compression flange thereby obviating the need for a steel plate on said compression flange.

Some of the principal disadvantages of the aforementioned method of increasing the strength of the composite rolled steel beam have been:

(1) The costs of welding: This includes the costs of welding rods, expensive welding equipment, handling and highly trained workmen.

(2) The costs of inspection: It is of prime importance that the wide flange beam and cover plate act in the manner in which they are designed. To insure that no damage has been made to the cover plated beam during welding the finished weld must be fully inspected usually by radiographical techniques.

(3) Cambering: Cambering of the wide flange beam and then welding on the cover plate requires care in the welding procedure in order to avoid warpage and its subsequent removal.

(4) Unintentional stresses: Care must be taken in the welding procedure to assure that unwanted stresses are not locked into the cover plated beam.

(5) Weakness: Ordinarily the cover plate is shorter than the beam. Due to the abrupt change in the cross-sectional area of the tension flange at the end of the cover plate, a plane of weakness, subject to fatique failure is created.

One of the principal objects of this invention is to provide an improvement over the widely utilized method of increasing the strength of a composite beam in which the tension member consists of a rolled wide flange beam with cover plate welded thereto.

The preferred form of the present invention consists in cutting, shearing, sawing or milling equal cross sectional areas from both sides of the top flange of an initially heavier rolled wide flange beam to provide the mathematical equivalent of an initially lighter rolled wide flange beam with cover plate welded thereto.

Other objects and a fuller understanding of the invention may be had by reference to the following description and claims, taken in conjunction with the accompanying drawings, in which like reference characters indicate like parts.

FIGURE 1 is an isometric fragmentary view of a composite beam construction.

FIGURE 2 is a cross sectional fragmentary view of a composite beam construction.

FIGURE 3 is a fragmentary plan view of a composite beam construction.

FIGURE 4 is a fragmentary plan view of a rolled steel wide flange beam in which the top flange is shown as being partially cut off.

FIGURE 5 is a fragmentary plan view of a rolled steel wide flange beam in which the top flange has been partially cut off.

FIGURE 6 is a fragmentary plan view of a rolled steel wide flange beam in which the top flange has been partially cut off.

FIGURE 1 illustrates the present state of the art in which: A concrete slab 12 has been cast on the top flange 13 of a rolled steel wide flange beam and around the shear transfer devices or anchors 11. The bottom or tension flange 10 is provided with a steel cover plate 14 which is attached by welding 15.

FIGURE 2 illustrates the new and improved method of providing increased strength to a composite beam in which the rolled steel wide flange beam with cover plate welded thereto of FIGURE 1 is replaced by an initially heavier rolled steel wide flange beam with equal or near equal cross sectional areas 17 cut or otherwise removed from the top flange such that the remaining area of the top flange is 16. The bottom flange 18 is the approximate equivalent of the structure of FIG. 1 in which the bottom flange 10 has a cover plate 14 welded thereto.

FIGURE 3 illustrates the preferred form of the invention in which the cuts are made in a straight line from end to end of beam, providing a constant width of top flange 16.

FIGURE 4 illustrates an alternate form of top flange 16.

FIGURE 5 illustrates an alternate form of top flange 16.

FIGURE 6 illustrates an alternate form of top flange 16.

Some of the advantages of the new and improved method of providing increased strength to a composite beam by this method include:

(1) Welding costs are eliminated.
(2) Inspection costs are greatly reduced or eliminated.
(3) Loss or change of camber due to welding is eliminated.
(4) Unwanted stresses cannot be unintentionally locked into the beam.
(5) Under the preferred form and some of the alternates the increased susceptibility to fatique failure is eliminated.
(6) Inventory requirements are greatly reduced since cover plates are not required and one initially heavier rolled wide flange beam can satisfy a great range of design conditions by the simple expedient of varying the areas removed from the top flange.
(7) In a great many cases the weight of the improved beam after removal of the top flange areas is less than the cover plated beam.
(8) The areas removed from the top flange have a salvage value which further reduces costs of the new and improved beam.
(9) The appearance of the bottom flange is improved.

Example 1

Assume that a highway bridge is to be constructed with composite beam sections spanning 88 feet spaced 6 feet from center to center and having a concrete slab 7.5 inches thick and a 0.5 inch monolithic wearing surface and provision for a future wearing surface of 30 pounds per square foot. The allowable extreme fibre stress for the steel is 20,000 pounds per square inch and the allowable fibre stress for concrete is 1,000 pounds per square inch.

The present state of the art would require a 36 Wide Flange beam having a weight of 230 pounds per lineal foot with a bottom flange cover plate having a cross sectional area of 15 square inches and a total weight of 281 pounds per lineal foot.

A beam for this bridge made according to the present invention would initially be a 36 Wide Flange beam having a weight of 300 pounds per lineal foot. Each side of the top flange would have a 4.5 inch width removed therefrom to reduce the beam's cross-sectional area by 15.12 square inches and its weight to 248 pounds per lineal foot. The resulting beam would be the structural equivalent in the composite structure of the above-mentioned beam and cover plate which weighed 281 pounds per lineal foot. Thus, a savings of 33 pounds of steel per lineal foot has been realized.

Although the above example is based on the elastic design method, the results are similar to the results that would have been obtained had the example been worked out based on ultimate strength methods, plastic design etc.

The foregoing example describes a composite beam in which a rolled wide flange beam with a cover plate may be replaced by providing an initially heavier rolled wide flange steel beam and cutting equal cross sectional areas from both sides of the top flange.

Alternatively, it has been found that a composite beam in which a rolled wide flange steel beam constitutes the tensile member can be similarly increased in strength using the same weight beam by cutting equal cross sectional areas from both sides of the top flange.

This is exemplified in the type of bridge described in Example 1. The beam which has a weight of 300 pounds per foot will normally support a span of approximately 84.5 feet. When the top flange is cut, a span of 88 feet may be supported. Thus, removal of material will enhance the ability of the beam to sustain a load.

The 300 pounds per lineal foot beam may even be replaced by an initially lighter beam which has portions of its top flange removed. Specifically, an 85 foot span may be supported by a beam which weighs 232 pounds per lineal foot, which is formed by removing the edges of the top flanges of a beam that initially weighs 280 pounds per lineal foot. The weight savings alone is thus 68 pounds per lineal foot.

What is claimed is:

1. A method of fabricating a composite beam for a load-bearing structure comprising the steps of:
   (a) rolling a steel I-beam having a pair of flanges of equal thickness and cross-sectional area interconnected by a web which lies centrally of and perpendicular to said flanges;
   (b) removing equal widths and thicknesses from both sides of the upper flange of said beam along substantially continuous lines which extend along a major longitudinal portion of said beam;
   (c) attaching upwardly-extending shear transfer devices to the upper flange of said beam;
   (d) embedding said shear transfer devices in a continuous slab of concrete; and
   (e) permitting said concrete to solidify.

2. The method according to claim 1 in which said substantially continuous lines are parallel to the longitudinal axis of said beam, whereby the removed widths from each side are equal in cross-sectional area at all portions.

References Cited by the Examiner

UNITED STATES PATENTS

| | | | |
|---|---|---|---|
| 1,597,278 | 8/1926 | Kahn | 52—334 |
| 1,725,439 | 8/1929 | Carns | 52—729 |
| 2,028,169 | 1/1936 | Sahlberg | 52—334 |
| 2,271,592 | 2/1942 | Hilpert | 52—334 |
| 2,617,179 | 11/1952 | Burke | 29—155 |

FOREIGN PATENTS 827,093 , 2/1960 Great Britain.

FRANK L. ABBOTT, *Primary Examiner.*

A. C. PERHAM, *Assistant Examiner.*